(12) United States Patent
Davis et al.

(10) Patent No.: US 12,385,436 B2
(45) Date of Patent: Aug. 12, 2025

(54) GAS TURBINE ENGINE FRONT CENTER BODY ARCHITECTURE

(71) Applicant: RAYTHEON TECHNOLOGIES CORPORATION, Farmington, CT (US)

(72) Inventors: Todd A. Davis, Tolland, CT (US); Brian P. Cigal, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 105 days.

(21) Appl. No.: 18/142,131

(22) Filed: May 2, 2023

(65) Prior Publication Data

US 2023/0272745 A1 Aug. 31, 2023

Related U.S. Application Data

(63) Continuation of application No. 16/836,001, filed on Mar. 31, 2020, now Pat. No. 11,713,713, which is a (Continued)

(51) Int. Cl.
*F02C 7/06* (2006.01)
*F01D 15/12* (2006.01)
(Continued)

(52) U.S. Cl.
CPC ............. *F02C 7/06* (2013.01); *F01D 15/12* (2013.01); *F01D 25/162* (2013.01); (Continued)

(58) Field of Classification Search
CPC ...... F02C 7/06; F02C 7/20; F02C 7/36; F02K 3/06; Y10T 29/49245; F05D 2230/60; F05D 2230/72; F05D 2230/70; F05D 2230/80; F01D 5/12; F01D 25/16; F01D 25/162; F01D 25/285; B23P 6/002; B23P 6/005
(Continued)

(56) References Cited

U.S. PATENT DOCUMENTS 3,909,085 A * 9/1975 Wilkinson ............ F16C 25/083
384/517
5,622,438 A * 4/1997 Walsh ................... F01D 25/162
384/624
(Continued)

*Primary Examiner* — Christopher Verdier
(74) *Attorney, Agent, or Firm* — Carlson, Gaskey & Olds, P.C.

(57) ABSTRACT

A gas turbine engine includes a fan that has fan blades wherein the fan delivers airflow to a bypass duct. A gearbox is defined along an engine axis. A low spool is arranged aft of the gearbox and coupled to drive the gearbox. A front center body assembly is defined around the engine axis. A flexible support supports the gearbox relative to the front center body assembly. A bearing package is mounted to the front center body assembly and the low spool. A front wall is mounted to the front center body assembly. The front wall is removable from the front center body assembly to access at least one of the gearbox or the bearing package. The low spool includes a low pressure compressor hub that provides an engagement feature for engaging the bearing package.

21 Claims, 8 Drawing Sheets

Related U.S. Application Data continuation of application No. 13/860,774, filed on Apr. 11, 2013, now Pat. No. 10,605,167, which is a continuation of application No. 13/732,647, filed on Jan. 2, 2013, now Pat. No. 8,911,204, which is a continuation of application No. 13/282,919, filed on Oct. 27, 2011, now Pat. No. 8,366,385, which is a continuation-in-part of application No. 13/275,286, filed on Oct. 17, 2011, now abandoned, and a continuation-in-part of application No. 13/087,579, filed on Apr. 15, 2011, now abandoned.

(60) Provisional application No. 61/789,224, filed on Mar. 15, 2013.

(51) Int. Cl.
| | | |
|---|---|---|
| F01D 25/16 | (2006.01) | |
| F01D 25/28 | (2006.01) | |
| F02C 7/20 | (2006.01) | |
| F02C 7/36 | (2006.01) | |
| F02K 3/06 | (2006.01) | |

(52) U.S. Cl.
CPC ............. *F01D 25/285* (2013.01); *F02C 7/20* (2013.01); *F02C 7/36* (2013.01); *F02K 3/06* (2013.01); *F05D 2230/60* (2013.01); *F05D 2230/70* (2013.01); *F05D 2230/72* (2013.01); *F05D 2230/80* (2013.01); *Y02T 50/60* (2013.01); *Y10T 29/49245* (2015.01)

(58) Field of Classification Search
USPC ............... 415/189–190, 209.2–209.4, 214.1, 415/229–230, 122.1, 124.1; 416/174, 416/244 A, 245 R, 170 R; 60/798; 29/889.1, 402.03, 426.1
See application file for complete search history.

(56) References Cited

U.S. PATENT DOCUMENTS

| | | | |
|---|---|---|---|
| 11,713,713 B2* | 8/2023 | Davis | F02C 7/36 29/888.025 |
| 2007/0084185 A1* | 4/2007 | Moniz | F02K 3/072 60/226.1 |
| 2008/0006018 A1* | 1/2008 | Sheridan | F02C 7/36 60/39.1 |
| 2009/0081039 A1* | 3/2009 | McCune | F02C 7/36 415/214.1 |
| 2010/0105516 A1* | 4/2010 | Sheridan | F16H 1/2827 475/346 |

* cited by examiner

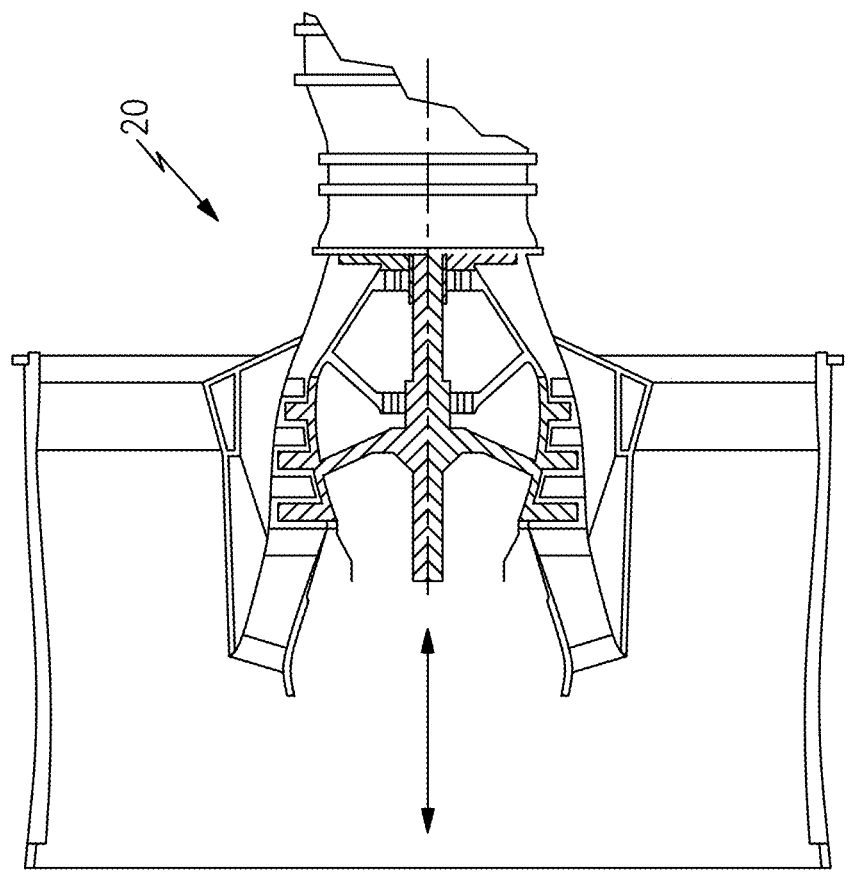
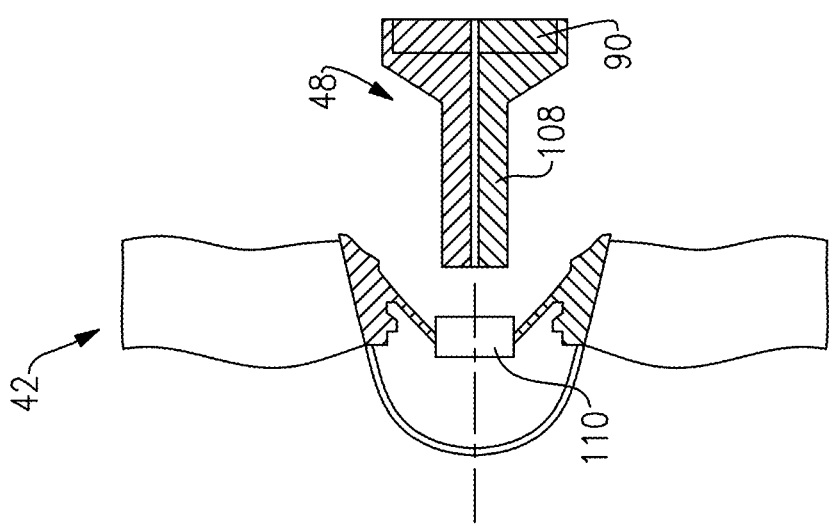
FIG.8

GAS TURBINE ENGINE FRONT CENTER BODY ARCHITECTURE

CROSS REFERENCE TO RELATED APPLICATIONS

The present disclosure is a continuation of U.S. patent application Ser. No. 16/836,001, filed Mar. 31, 2020, which is a continuation of U.S. patent application Ser. No. 13/860,774, filed Apr. 11, 2013, now granted U.S. Pat. No. 10,605,167 granted Mar. 31, 2020, which claims benefit of U.S. Provisional Application No. 61/789,224 filed Mar. 15, 2013 and is also a continuation of application Ser. No. 13/732,647, filed Jan. 2, 2013, now granted U.S. Pat. No. 8,911,204 granted Dec. 16, 2014, which is a continuation of U.S. patent application Ser. No. 13/282,919, filed on Oct. 27, 2011, now granted U.S. Pat. No. 8,366,385 granted Feb. 5, 2013, which is a continuation-in-part application of U.S. patent application Ser. No. 13/087,579, filed 15 Apr. 2011, now abandoned, and of U.S. patent application Ser. No. 13/275,286, filed 17 Oct. 2011, now abandoned.

BACKGROUND

The present disclosure relates to a gas turbine engine, and in particular, to a case structure therefor.

Gas turbine engines typically include one or more rotor shafts that transfer power and rotary motion from a turbine section to a compressor section and fan section. The rotor shafts are supported within an engine static structure which is typically constructed of modules with individual case sections which are joined together at bolted flanges. The flanges form a joint capable of withstanding the variety of loads transmitted through the engine static structure. An ongoing issue for gas turbine engines is the ease and speed at which they can be serviced.

SUMMARY

In one exemplary embodiment, a method for servicing a gas turbine engine includes disassembling a bearing compartment, providing access from a forward side of the gas turbine engine to a gearbox contained within said bearing compartment. The gas turbine engine provides a core flow path that extends from the forward side aftward in a core flow direction. The method includes servicing a component located within the bearing compartment.

In a further embodiment of any of the above, disassembling the bearing compartment includes disassembling a front wall from a front center body support.

In a further embodiment of any of the above, the method includes providing access from the forward side to a flex support mounted within the front center body support. The flex support is mounted to the gearbox.

In a further embodiment of any of the above, the method includes disassembling a bearing package from the front center body support.

In a further embodiment of any of the above, the method includes disassembling the front wall from an output shaft driven by the gearbox.

In a further embodiment of any of the above, the step of disassembling includes removing as a module the gearbox by displacing the gearbox forward and away from said bearing compartment and a low spool.

In a further embodiment of any of the above, the component servicing step includes servicing one of the gearbox, a bearing package and a seal package.

In another exemplary embodiment, a method for servicing a gas turbine engine includes providing access from a forward side of a front center body assembly to a gearbox driven by a low spool, and servicing a component located within a bearing compartment aft of the front center body assembly.

In a further embodiment of any of the above, the method includes disassembling a fan mounted to the gearbox.

In a further embodiment of any of the above, the method includes removing first fasteners located within the forward side of the front center body assembly to disassemble a front wall from a front center body support of the front center body assembly.

In a further embodiment of any of the above, the disassembling step includes removing a fan hub from an output shaft coupled to the gearbox. The fasteners removing step is performed subsequent to the fan hub removing step.

In a further embodiment of any of the above, the forward side faces a fan.

In a further embodiment of any of the above, the access providing step includes removing as a module the gearbox by displacing the gearbox forward and away from said bearing compartment and said low spool thereby exposing the component. The component servicing step includes servicing one of a bearing package and a seal package.

In another exemplary embodiment, a gas turbine engine includes a gearbox defined along an engine axis. A low spool is arranged aft of the gearbox and is operable to drive said gearbox. A front center body support is defined around the engine axis. A bearing package is mounted to the front center body support and the low spool. A seal package is located aft of the bearing package. A front wall is mounted to the front center body support. The front wall is removable from the front center body support to access at least one of the gearbox, the bearing package and the seal package.

In a further embodiment of any of the above, the front center body support is defined about an engine longitudinal axis.

In a further embodiment of any of the above, the seal package is mounted to the front center body support.

In a further embodiment of any of the above, the front center body support includes a flange which abuts a flange of the front wall.

In a further embodiment of any of the above, the gas turbine engine includes fasteners, which attach the flange of the front wall to the flange of the front center body support.

In a further embodiment of any of the above, the fasteners are accessible from a forward side of the gas turbine engine.

In a further embodiment of any of the above, the front wall supports a bearing structure to support an output shaft driven by the gearbox. The output shaft is operable to drive a fan.

In a further embodiment of any of the above, the gearbox drives a fan section at a speed different than a speed of the low speed spool.

In a further embodiment of any of the above, the front center body support provides a unitary component with a front center body section having a vane arranged in an annular core path and that at least partially defines a core flow path.

In a further embodiment of any of the above, the front center body support and the front center body section are integral with one another.

In a further embodiment of any of the above, the front center body support and the front center body section are welded to one another.

In a further embodiment of any of the above, the gas turbine engine includes a coupling shaft interconnecting and splined to each of the gearbox and the coupling shaft section.

In a further embodiment of any of the above, the low spool includes a low pressure compressor hub providing a spline engageable with the bearing package. The seal package is mounted to the low pressure compressor hub.

In one exemplary embodiment, a gas turbine engine is configured to include a propulsor section having a fan drive geared architecture. The engine includes a gas generator section that includes a compressor section having a first rotor rotationally mounted to a first spool. Further included is a bearing package rotationally supporting the first spool. The bearing package supports the first spool during at least one of (1) a period prior to installation of the fan drive geared architecture into the engine and (2) a period after removal of the fan drive geared architecture from the engine.

In a further embodiment of any of the above, the first spool is a low spool of the engine.

In a further embodiment of any of the above, the fan drive geared architecture drives a fan section at a speed different than a speed of the low spool.

In a further embodiment of any of the above, a front center body support is defined around an engine longitudinal axis.

In a further embodiment of any of the above, the bearing package is mounted to the front center body support and the low spool.

In a further embodiment of any of the above, an engine static structure is included.

In a further embodiment of any of the above, the bearing package is adapted for rotationally supporting the first spool against the static structure.

Another exemplary embodiment includes a method of supporting a first rotor of a gas turbine engine. The engine is configured to include a propulsor section having a fan drive geared architecture. The engine further includes a gas generator section that includes a compressor section having a first rotor rotationally mounted to a first spool, an engine static structure, and a bearing package adapted for rotationally supporting the first spool against the engine static structure. The method includes supporting the first rotor with the bearing package during at least one of (1) a period prior to installation of the fan drive geared architecture into the engine and (2) a period after removal of the fan drive geared architecture from the engine.

In a further embodiment of any of the above, the compressor section includes a low pressure compressor.

In a further embodiment of any of the above, the bearing package supports the first rotor during each of (1) before the fan drive geared architecture into the engine and (2) after the fan drive geared architecture is removed from the engine.

In a further embodiment of any of the above, the fan drive geared architecture includes a gearbox.

In a further embodiment of any of the above, the bearing package supports a low rotor of the engine.

In a further embodiment of any of the above, the geared architecture is serviced while removed from the engine.

Another exemplary embodiment of a method of partially disassembling a gas turbine engine. The engine includes a propulsor section having a fan drive geared architecture, a gas generator section that includes a compressor section having a first rotor rotationally mounted to a first spool, an engine static structure, and a bearing package adapted for rotationally supporting the first spool relative to the static structure. The method includes removing the propulsor section without otherwise supporting the first rotor, whereby the bearing package disposed within the engine supports the first rotor.

In a further embodiment of any of the above, the compressor section includes a low pressure compressor.

In a further embodiment of any of the above, the bearing package is provided in a bearing compartment of the engine.

In a further embodiment of any of the above, the geared architecture includes a gearbox.

In a further embodiment of any of the above, the first rotor is the low rotor of the engine.

In a further embodiment of any of the above, the geared architecture is serviced while removed from the engine.

In a further embodiment of any of the above, the bearing package is adapted for rotationally supporting the first spool against the static structure.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 8 is a schematic view of a forward gearbox removal from the gas turbine engine.

DETAILED DESCRIPTION

Figure 1:
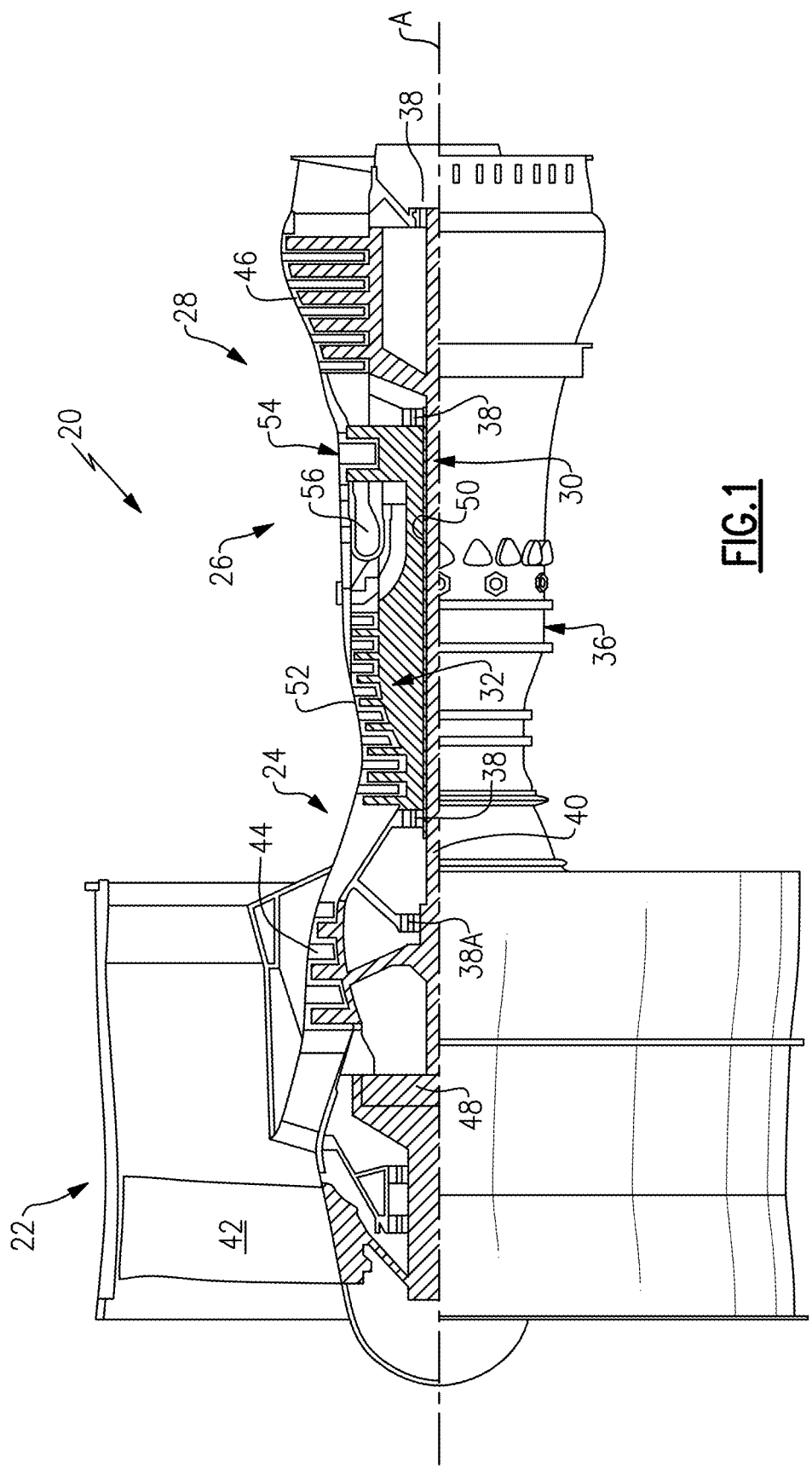
FIG. 1 is a schematic cross-section of an embodiment of a gas turbine engine.

FIG. 1 schematically illustrates a gas turbine engine 20. The gas turbine engine 20 is disclosed herein as a two-spool turbofan that generally incorporates a propulsor section that includes a fan section 22, and a gas generator section that includes a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbo gas turbine engine in the disclosed non-limiting embodiment, it should be understood that the concepts described herein are not limited to use with turbofans as the teachings may be applied to other types of turbine engines.

The engine 20 generally includes a low spool 30 and a high spool 32 mounted for rotation about an engine central longitudinal axis A relative to an engine static structure 36 via several bearing supports 38. The low spool 30 generally includes an inner shaft 40 that interconnects a fan 42, a low pressure compressor 44 and a low pressure turbine 46. The inner shaft 40 drives the fan 42 through a geared architecture 48 to drive the fan 42 at a lower speed than the low spool 30. For purposes of relating to the disclosed embodiments, the geared architecture is considered part of the propulsor section. The high spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40, 50 are supported at a plurality of points by the bearing system 38 within the static structure 36. In one non-limiting embodiment, bearing system 38 includes a #2 bearing support 38A located within the compressor section 24.

Figure 2:
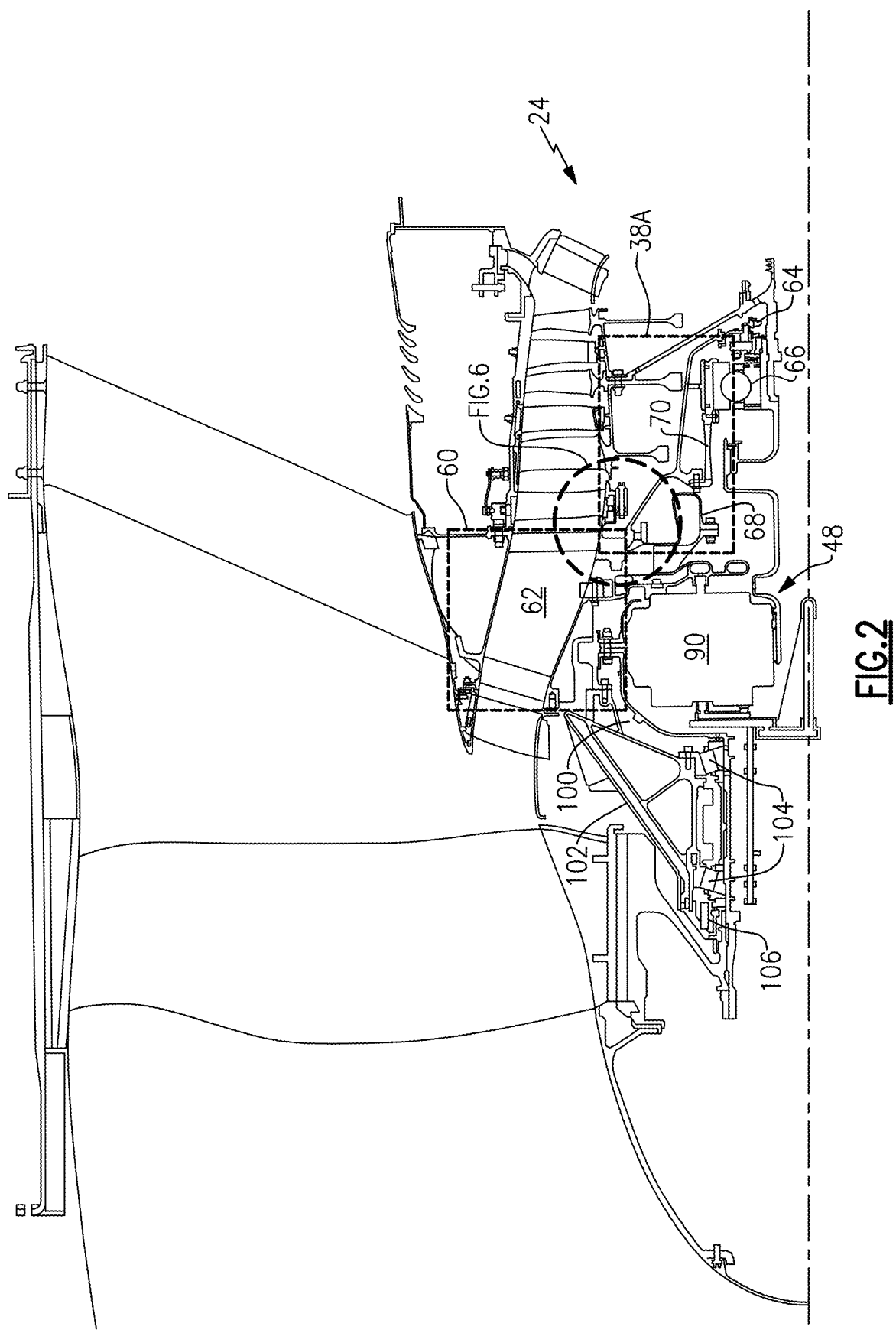
FIG. 2 is an enlarged cross-section of a portion of the gas turbine engine which illustrates a front center body assembly.

With reference to FIG. 2, the engine static structure 36 proximate the compressor section 24 includes a front center body assembly 60 adjacent a #2 bearing support 38A. The front center body assembly 60 generally includes a front center body support 62. The #2 bearing support 38A generally includes a seal package 64, a bearing package 66, a flex support 68 and a centering spring 70.

Figure 3:
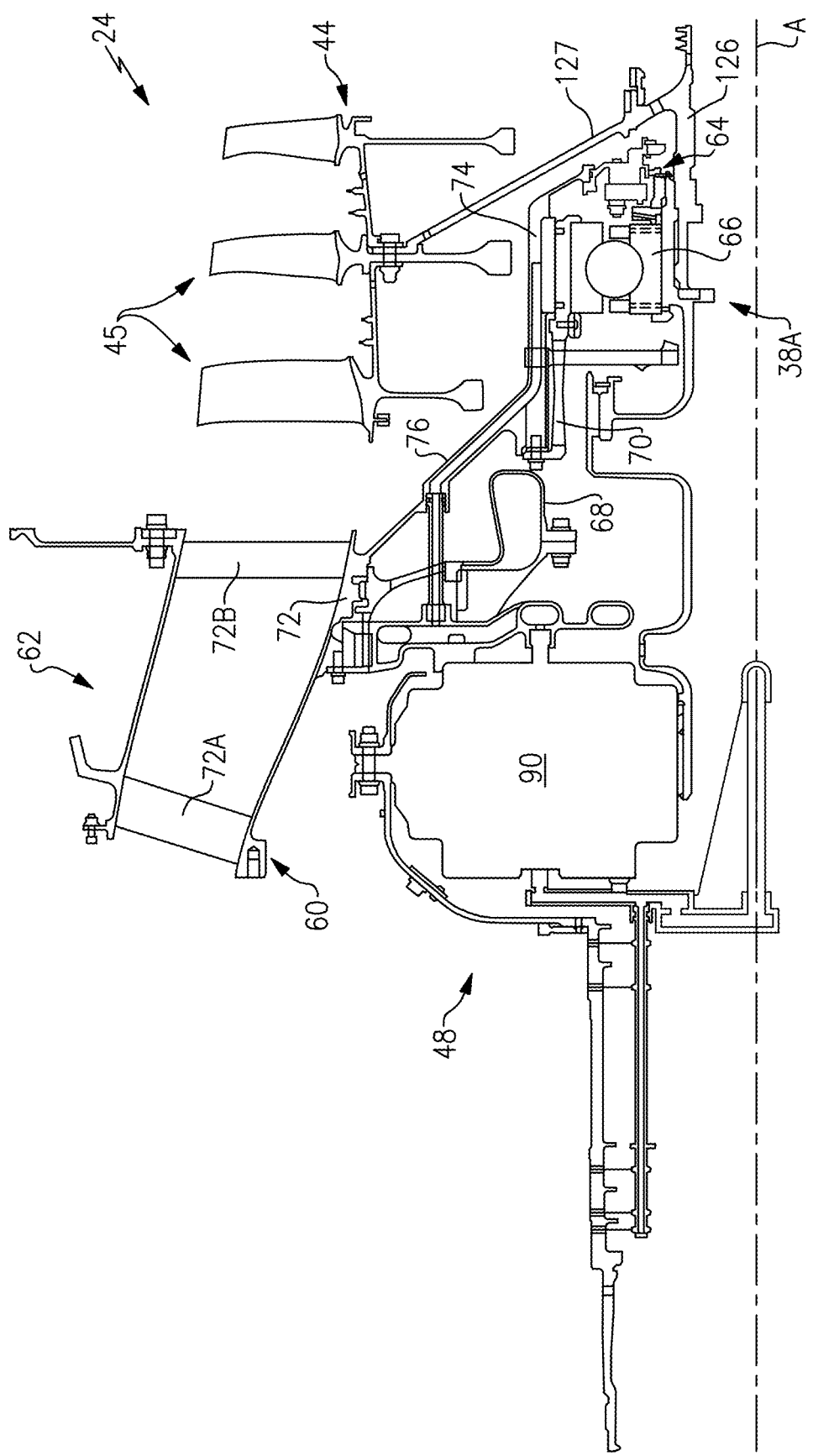
FIG. 3 is an enlarged cross-section of the geared architecture of the gas turbine engine.
Figure 4:
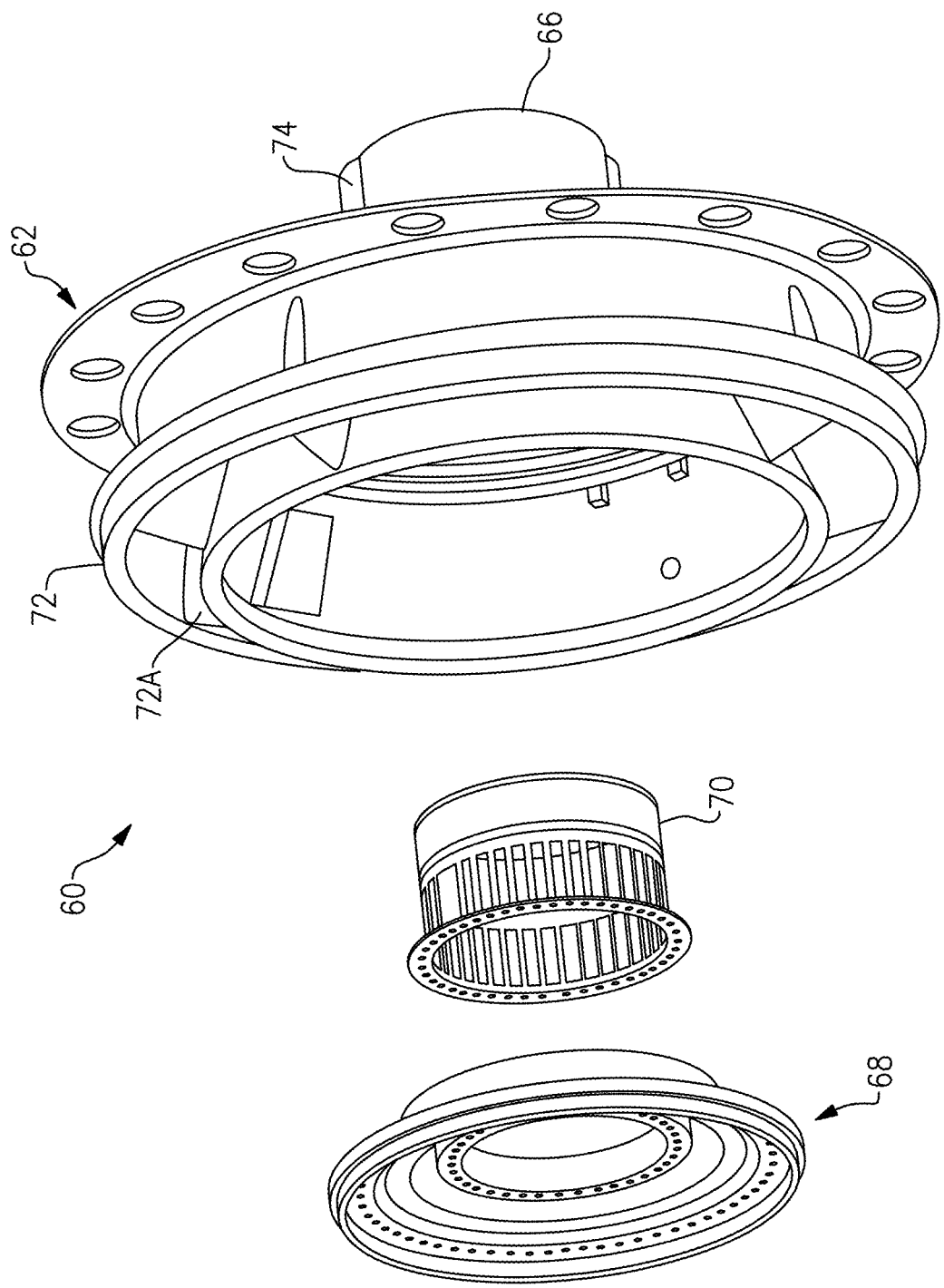
FIG. 4 is an exploded perspective view of a front center body assembly.

With reference to FIG. 3, the flex support 68 provides a flexible attachment of the geared architecture 48 within the front center body support 62 (also illustrated in FIG. 4). The flex support 68 reacts the torsional loads from the geared architecture 48 and facilitates vibration absorption as well as other support functions. The centering spring 70 is a generally cylindrical cage-like structural component with a multiple of beams which extend between flange end structures (also illustrated in FIG. 4). The centering spring 70 resiliently positions the bearing package 66 with respect to the low spool 30. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

Figure 5:
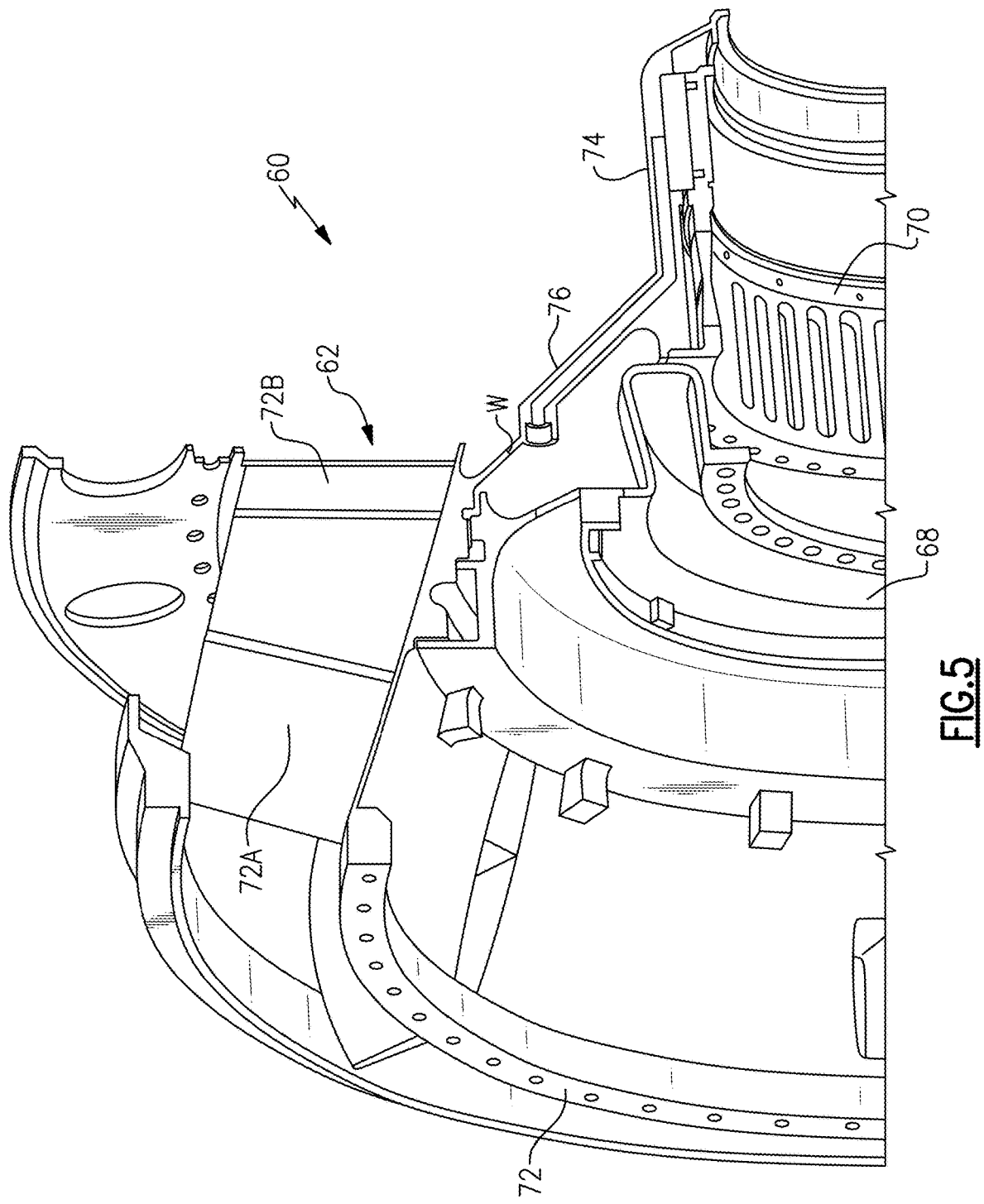
FIG. 5 is an enlarged perspective partial cross-section of a front center body support of the front center body assembly.

The front center body support 62 includes a front center body section 72 and a bearing section 74 defined about axis A with a frustro-conical interface section 76 therebetween (FIG. 5). The front center body section 72 at least partially defines the core flowpath into the low pressure compressor 44. The front center body section 72 includes an annular core passage with a multiple of front center body vanes 72A, 72B. The bearing section 74 is defined radially inward of the front center body section 72. The bearing section 74 locates the bearing package 66 and the seal package 64 with respect to the low spool 30. The frustro-conical interface section 76 combines the front center body section 72 and the bearing section 74 to form a unified load path, substantially free of kinks typical of a conventional flange joint, from the bearing package 66 to the outer periphery of the engine static structure 36. The frustro-conical interface section 76 may include a weld W (FIG. 5) or, alternatively, be an integral section such that the front center body support 62 is a unitary component.

The integral, flange-less arrangement of the frustro-conical interface section 76 facilitates a light weight, reduced part count architecture with an increased ability to tune the overall stiffness and achieve rotor dynamic requirements. Such an architecture also further integrates functions such as oil and air delivery within the bearing compartment which surrounds bearing package 66.

Figure 6:
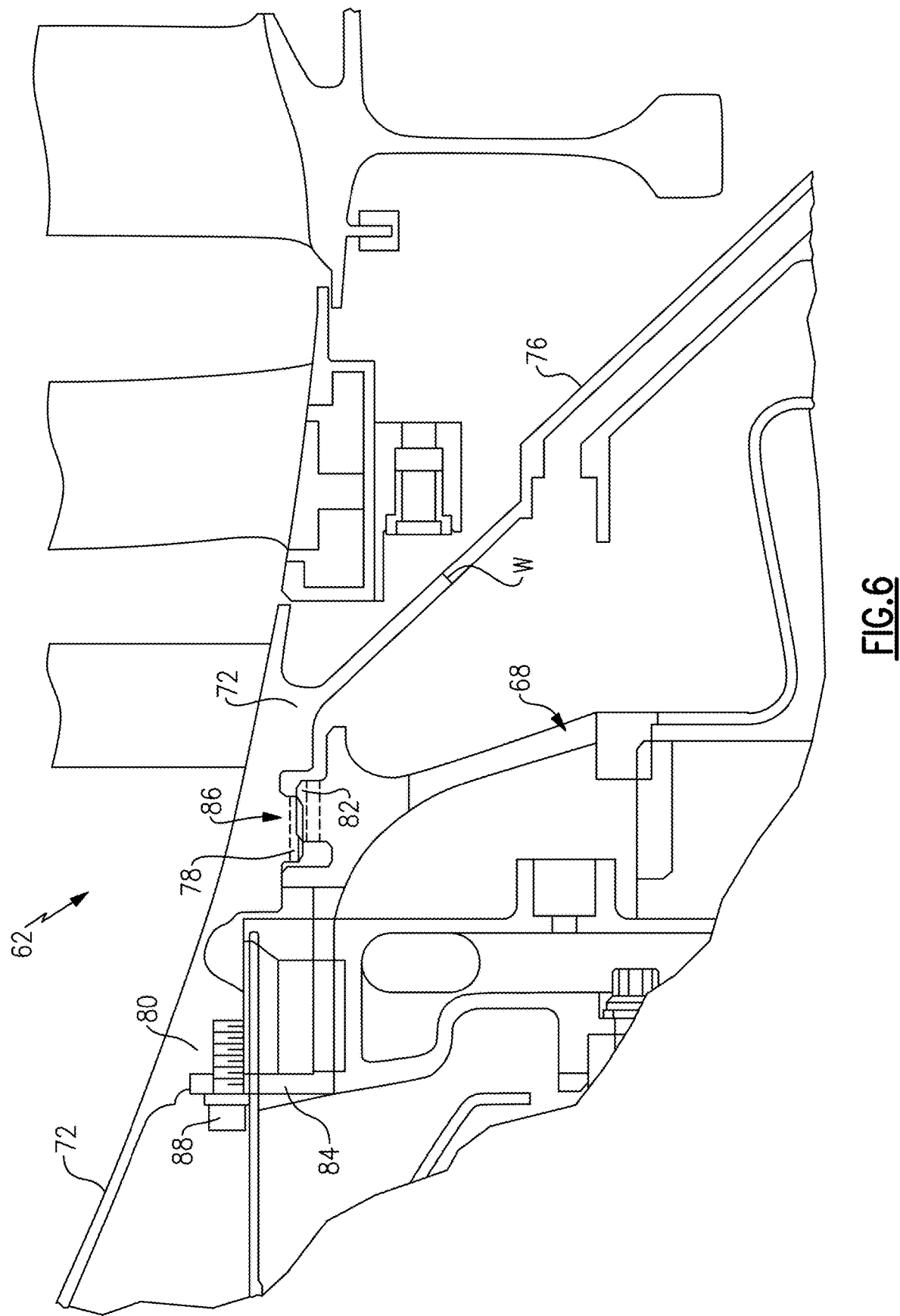
FIG. 6 is an enlarged sectional view of the front center body support.

With reference to FIG. 6, the front center body support 62 includes mount features to receive the flex support 68. In one disclosed non-limiting embodiment, the mount features of the front center body support 62 includes an internal spline 78 and a radial inward directed fastener flange 80 on the front center body section 72. The flex support 68 includes a corresponding outer spline 82 and radially outwardly directed fastener flange 84. The flex support 68 is received into the front center body support 62 at a splined interface 86 formed by splines 78, 82 and retained therein such that fastener flange 84 abuts fastener flange 80. A set of fasteners 88 such as bolts are threaded into the fastener flanges 80, 84 to mount the flex support 68 within the front center body support 62.

Figure 7:
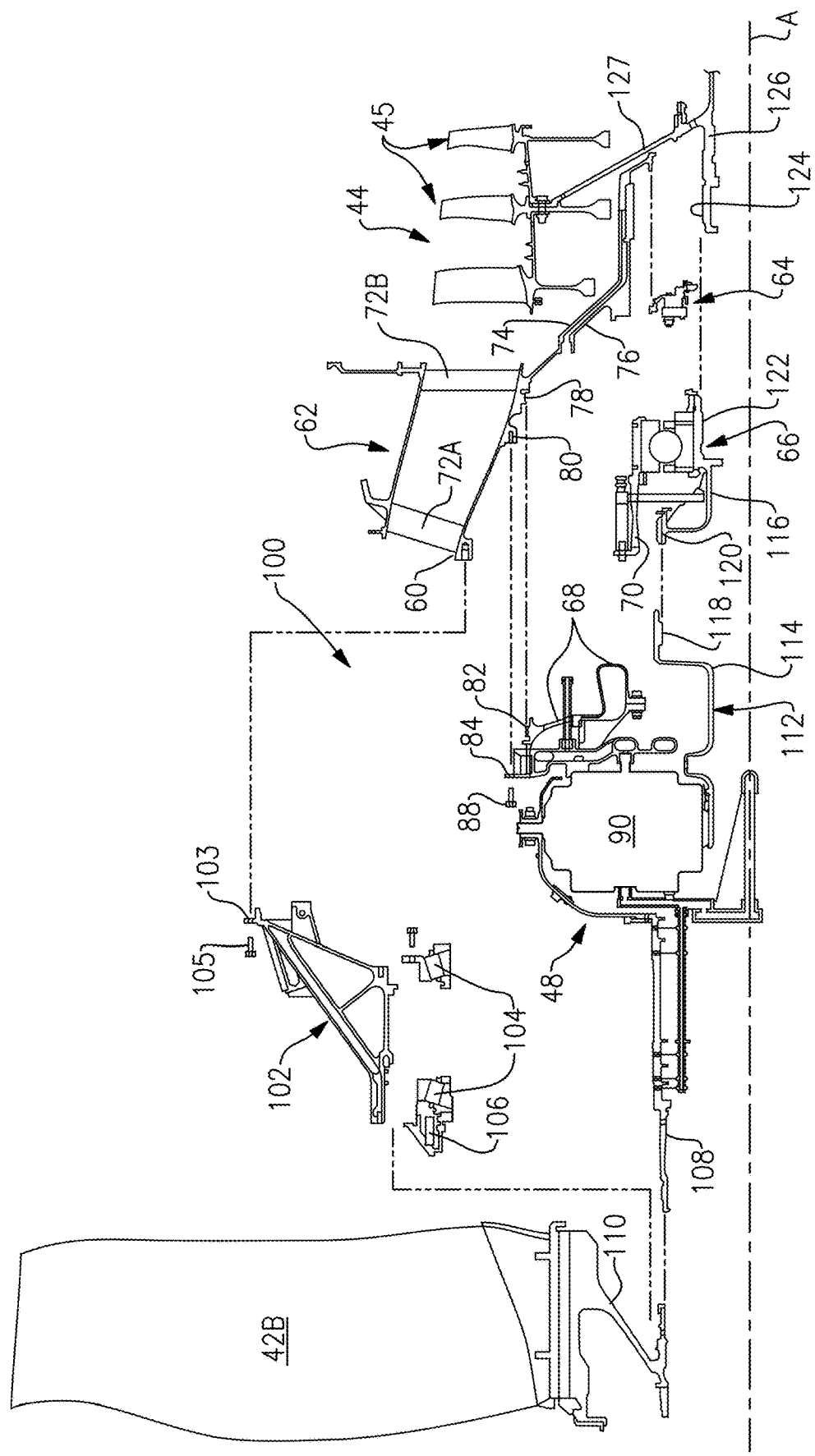
FIG. 7 is an exploded view of the front center body support.

With reference to FIG. 7, the fasteners 88 are directed forward to provide access from a forward section of the front center body assembly 60 opposite the bearing package 66 of the number two bearing system 38A. The fasteners 88 are thereby readily removed to access a gearbox 90 of the geared architecture 48.

A front wall 102 aft of the fan 42 is mounted to a forward section of the front center body support 62 to provide access to the geared architecture 48 from the front of the engine 20. The front wall 102 includes a flange 103 mountable to the front center body support 62 at the flange 60 by a multiple of fasteners 105, which fasteners 105 may in one non-limiting embodiment be bolts. The front wall 102 and the front center body support 62 define a bearing compartment 100 (also shown in FIG. 2) which mounts to the bearing package 66. The front wall 102 is removable such that the gearbox 90 may be accessed as a module. The gearbox 90 may thereby be accessed to facilitate rapid on-wing service.

It should be appreciated that various bearing structures 104 (illustrated schematically and in FIG. 2) and seals 106 (illustrated schematically and in FIG. 2) may be supported by the front wall 102 to contain oil and support rotation of an output shaft 108. The output shaft 108 connects with the geared architecture 48 to drive the fan 42. Fan blades 42B extend from a fan hub 110 which are mounted to the output shaft 108 for rotation therewith. It should be appreciated that the bearing structures 104 and seals 106 may, in the disclosed non-limiting embodiment may be disassembled with the front wall 102 as a unit after removal of the fan hub 110.

The gearbox 90 is driven by the low spool 30 (FIG. 1) through a coupling shaft 112. The coupling shaft 112 transfers torque through the bearing package 66 to the gearbox 90 as well as facilitates the segregation of vibrations and other transients. The coupling shaft 112 generally includes a forward coupling shaft section 114 and an aft coupling shaft section 116 which extends from the bearing package 66. The forward coupling shaft section 114 includes an interface spline 118 which mates with an aft spline 120 of the aft coupling shaft section 116. An interface spline 122 of the aft coupling shaft section 116 connects the coupling shaft 112 to the low spool 30 through, in this non limiting embodiment, splined engagement with a spline 124 on a low pressure compressor hub 126 of the low pressure compressor 44. In the implementation of FIGS. 3 and 7, the low pressure (e.g., first) compressor 44 includes the compressor hub 126 and a disk 127 extending from the compressor hub 126 to support a plurality of compressor blades 45. The bearing package 66 engages the compressor hub 126 at a position forward of the disk 127 relative to the engine longitudinal axis A (see also FIG. 3).

To remove the gearbox 90, the fan hub 110 is disassembled from the output shaft 108. The multiple of fasteners 105 are then removed such that the front wall 102 is disconnected from the front center body support 62. The multiple of fasteners 88 are then removed from the front of the engine 20. The geared architecture 48 is then slid forward out of the front center body support 62 such that the interface spline 118 is slid off the aft spline 120 and the outer spline 82 is slid off the internal spline 78. The geared architecture 48 is thereby removable from the engine 20 as a module (FIG. 8; illustrated schematically). It should be appreciated that other componentry may need to be disassembled to remove the geared architecture 48 from the engine 20, however, such disassembly is relatively minor and need not be discussed in detail. It should be further appreciated that other components such as the bearing package 66 and seal 64 are also now readily accessible from the front of the engine 20.

Removal of the gearbox 90 from the front of the engine 20 as disclosed saves significant time and expense. The geared architecture 48, is removable from the engine 20 as a module and does not need to be further disassembled. Moreover, although the geared architecture 48 must be removed from the engine to gain access to the bearing package 66 and the seal 64, the geared architecture 48 does not need to be removed from the engine 20 to gain access to the engine core itself. Further, as one would appreciate from the above, in an example where a portion of the geared architecture 48 itself requires service, the bearing package 66 can remain in place to support the low spool 30, and in turn a low rotor, of the gas turbine engine 20 while the geared architecture 48 is removed for service.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine comprising:
    a propulsor including a plurality of blades;
    a geared architecture including a gearbox;
    a first spool including a first shaft interconnecting a first turbine and a first compressor, and the first compressor includes a compressor hub and a disk extending from the compressor hub to support a plurality of compressor blades;
    a front center body assembly defined around an engine longitudinal axis, wherein the front center body assembly defines a portion of a core flow path through the gas turbine engine that is upstream of an inlet to the first compressor;
    a flex support that supports the gearbox relative to the front center body assembly;
    a bearing support including a bearing package mounted to the front center body assembly and the first spool, wherein the bearing package engages the compressor hub at a position forward of the disk relative to the engine longitudinal axis;
    a front wall mounted to the front center body assembly; and
    wherein the front wall is removable from the front center body assembly to access at least one of the gearbox or the bearing package.

2. The gas turbine engine as recited in claim 1, wherein the flex support establishes a flexible attachment of the geared architecture within a front center body support of the front center body assembly, and the flex support is configured to react torsional loads from the geared architecture.

3. The gas turbine engine as recited in claim 2, wherein the gearbox is axially aligned with the front center body support relative to the engine longitudinal axis.

4. The gas turbine engine as recited in claim 2, wherein the geared architecture is removeable from the gas turbine engine as a module.

5. The gas turbine engine as recited in claim 2, wherein the bearing package is axially aft of the flex support relative to the engine longitudinal axis.

6. The gas turbine engine as recited in claim 4, wherein the front wall supports a front bearing structure positioned along a periphery of an output shaft, and the output shaft interconnects the geared architecture and the propulsor.

7. The gas turbine engine as recited in claim 4, wherein:
    the front wall and the front center body support establish a bearing compartment;
    the front center body support includes a front center body section, a bearing section and an interface section that interconnects the front center body section and the bearing section; and
    the front center body section includes an annular flow path that establishes the portion of the core flow path, and an array of vanes are circumferentially distributed in the annular flow path.

8. The gas turbine engine as recited in claim 7, wherein the interface section has a frustro-conical geometry that flairs radially outwardly from the bearing section towards the front center body section.

9. The gas turbine engine as recited in claim 7, further comprising:
    a centering spring that resiliently positions the bearing package with respect to the first spool.

10. The gas turbine engine as recited in claim 7, wherein:
    the geared architecture is removable from the gas turbine engine in response to sliding the geared architecture in a forward direction out of the front center body support relative to the engine longitudinal axis.

11. The gas turbine engine as recited in claim 10, wherein the bearing package engages the compressor hub to establish a first splined interface.

12. The gas turbine engine as recited in claim 10, wherein the flex support disengages the front center body support in response to sliding the geared architecture in the forward direction.

13. The gas turbine engine as recited in claim 12, wherein the flex support engages the front center body support to establish a second splined interface.

14. The gas turbine engine as recited in claim 10, wherein the bearing support includes a seal package positioned aft of the bearing package relative to the engine longitudinal axis, and the seal package is mounted to the bearing section of the front center body assembly.

15. The gas turbine engine as recited in claim 10, further comprising:
   a centering spring that resiliently positions the bearing package with respect to the first spool; and
   wherein the centering spring includes an array of beams circumferentially distributed about the engine longitudinal axis.

16. The gas turbine engine as recited in claim 10, further comprising:
   a coupling shaft interconnecting the gearbox and the bearing package; and
   wherein the first spool drives the gearbox through the coupling shaft, and the coupling shaft facilitates segregation of vibrations.

17. The gas turbine engine as recited in claim 16, wherein:
   the coupling shaft engages the bearing package to establish a third splined interface.

18. The gas turbine engine as recited in claim 10, wherein the front center body support includes a first flange that abuts a flange of the front wall, and a plurality of fasteners attach the first flange of the front wall to the flange of the front center body support.

19. The gas turbine engine as recited in claim 18, wherein the fasteners are accessible from a forward side of the gas turbine engine relative to the engine longitudinal axis.

20. The gas turbine engine as recited in claim 18, wherein the flex support includes a flange that abuts a second flange of the front center body support, and a plurality of fasteners attach the flange of the flex support to the second flange of the front center body support.

21. The gas turbine engine as recited in claim 10, wherein the propulsor is a fan, and an outer housing surrounds the fan to establish a bypass duct.

\* \* \* \* \*